Oct. 28, 1958  G. T. McCLURE ET AL  2,858,170
FLUID PRESSURE BRAKE CONTROL APPARATUS WITH SELECTOR
MEANS PROVIDING FOR DIFFERENT TYPES OF BRAKE RELEASE
Filed July 3, 1956
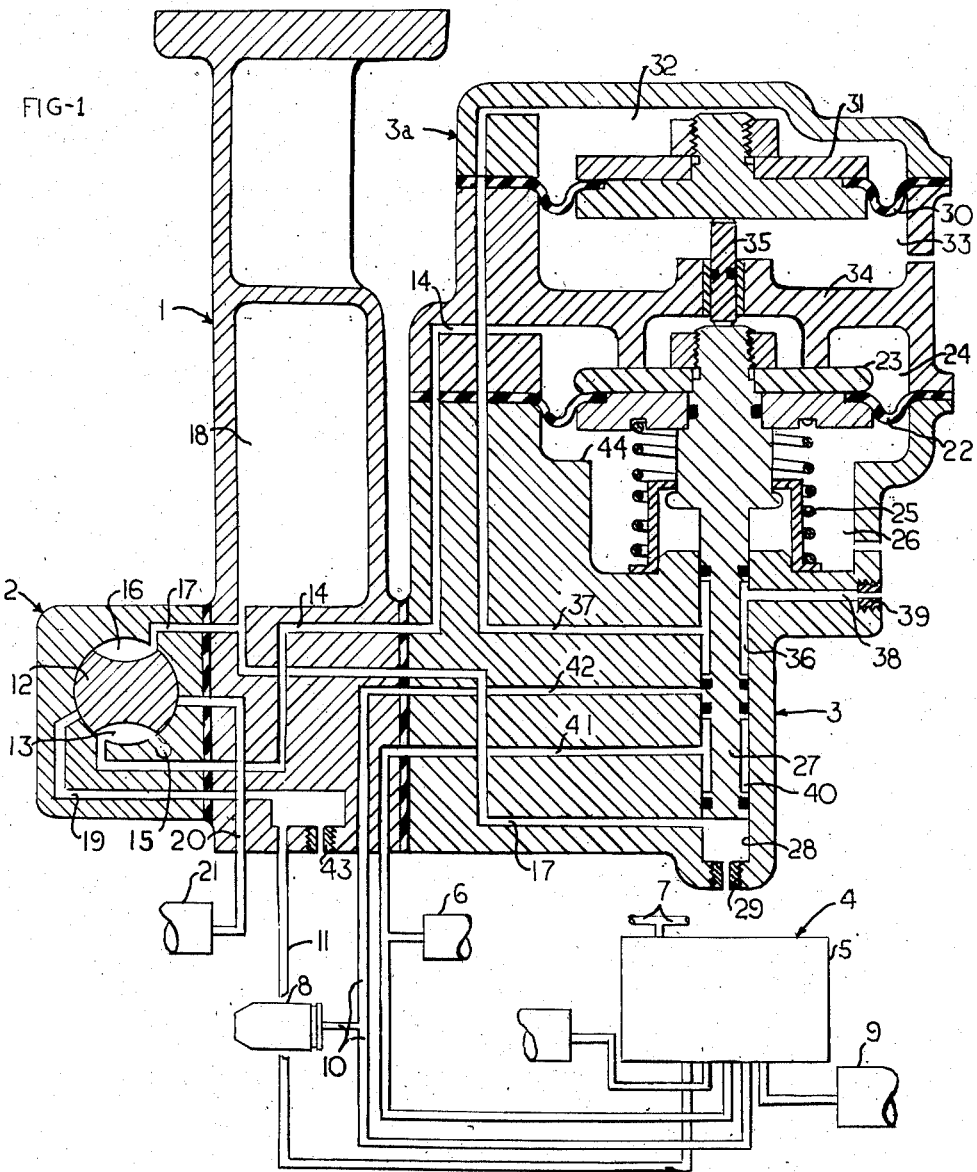
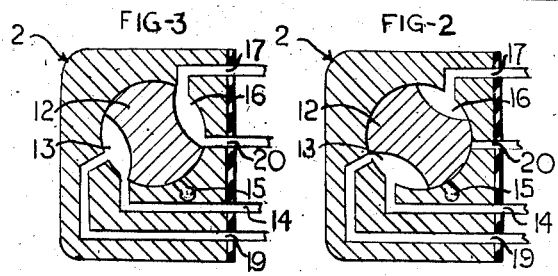
*INVENTOR.*
GLENN T. McCLURE
JOHN W. RUSH
BY
ATTORNEY

United States Patent Office 2,858,170
Patented Oct. 28, 1958

2,858,170

FLUID PRESSURE BRAKE CONTROL APPARATUS WITH SELECTOR MEANS PROVIDING FOR DIFFERENT TYPES OF BRAKE RELEASE

Glenn T. McClure, McKeesport, and John W. Rush, Pittsburgh, Pa., assignors to Westinghouse Air Brake Company, Wilmerding, Pa., a corporation of Pennsylvania Application July 3, 1956, Serial No. 595,619

6 Claims. (Cl. 303—36)

This invention relates to fluid pressure brake control apparatus of the type wherein the degree of application and release of the brakes is controlled according to the extent of reduction and restoration, respectively, in pressure of fluid in a brake pipe relative to a datum pressure in a control reservoir. The invention relates more particularly to such brake control apparatus embodying selector means conditionable for causing such apparatus to operate to control release of brakes on a particular car in a manner compatible with the type of release effected on other cars of a train equipped, alternatively, with other apparatus of the same type or with conventional graduated release brake control apparatus, or with conventional direct release brake control apparatus.

In the copending application of Earle S. Cook et al., U. S. Serial No. 598,964, filed July 19, 1956, now Patent No. 2,821,442 and assigned to the assignee of the present invention, there is shown and described a so-called "No. 26 control valve" for controlling brakes on high-speed, lightweight passenger cars. This control valve comprises, briefly, a self-lapping type service valve device which is capable of providing any desired degree of graduated release of brakes, according to the extent to which brake pipe pressure is restored toward the value of a datum pressure in a control reservoir.

The principal object of this invention is to provide a brake release selector means for use on a railway car equipped with a self-lapping type control valve, such as the No. 26, to cause such control valve to control release of brakes on such car in harmony with the type of release control effected on other cars of a train, whether such other cars be equipped with (a) other self-lapping type control valves, such as the "No. 26"; (b) "D-22" or "Universal" control valves which effect a graduated release of brakes according to a brake cylinder pressure reduction pattern or curve different from that effected by the No. 26 control valve; or (c) the "AB," "AC" or "K" control valves which effect a full direct release of brakes.

Other objects and advantages will become apparent from the following more detailed description of the invention and from the accompanying drawing, wherein:

Fig. 1 is a diagrammatic view of a brake release selector means embodying the invention, shown associated with a self-lapping control valve of the No. 26 type, and positioned for conditioning said control valve to control brake release on the particular car in harmony with that on other cars also equipped with No. 26 control valves;

Fig. 2 is a diagrammatic view of a manually operable selector valve of the brake release selector means of Fig. 1, shown positioned for controlling brake release on a car equipped with a No. 26 control valve in harmony with the type of graduated brake release control effected on other cars equipped with D-22 or Universal control valves; and Fig. 3 is a diagrammatic view of the manually operable selector valve of the brake release selector means of Fig. 1, shown positioned for controlling brake release on a car equipped with a No. 26 control valve in harmony with the direct-type brake release control effected on other cars equipped with AB, AC or K control valves.

*Description—Fig. 1*

As shown in this figure of the drawing, the brake release selector means embodying the invention comprises a pipe bracket 1, on faces of which are mounted a manually operable selector valve device 2 and a pneumatically controlled selector valve device 3 including a fluid pressure loading device 3a. This selector means is associated with a self-lapping type brake controlling valve device 4, which may, for sake of illustration, be of the No. 26 type fully shown and described in the aforementioned copending application of Cook et al.

This valve device 4 comprises a service portion 5 embodying self-lapping service valve means (not shown) controlled by two diaphragms (not shown) of different effective areas arranged in a stack, such that pressure of fluid in a control reservoir 6 acting on the larger diaphragm opposes pressure of fluid in a brake pipe 7 acting on said larger diaphragm and also opposes pressure of fluid in a brake cylinder 8 and a spring bias acting on the smaller diaphragm.

When the brake pipe 7 is fully charged, the control reservoir 6 will be charged to a datum pressure equal to the full charge value of brake pipe pressure and, under action of the spring bias, the aforementioned valve means will be maintained in a release position, in which the brake cylinder 8 is opened to atmosphere. The diaphragm stack responds to a chosen reduction in brake pipe pressure below the datum pressure then bottled up in the control reservoir 6 to cause operation of the valve means to supply fluid under pressure from an auxiliary reservoir 9 to the brake cylinder 8 via a pipe 10 until brake cylinder pressure acting on the smaller diaphragm has increased sufficiently to cause the stack and hence the valve means to shift to a lap position, for terminating such supply and bottling up fluid in the brake cylinder at a pressure corresponding to the extent of such chosen reduction in brake pipe pressure. Upon a subsequent increase in brake pipe pressure, the stack will shift the valve means to release position for releasing fluid under pressure from the brake cylinder 8 to atmosphere via a brake cylinder exhaust pipe 11 to a degree corresponding substantially to the extent to which brake pipe pressure is restored toward the value of control reservoir pressure; it being noted that if brake pipe pressure is only partially restored, the stack will shift the valve means to lap position and thereby effect a graduated release of brakes when brake cylinder pressure has been partially reduced an extent corresponding to any operator-selected degree of brake pipe pressure increase.

The manually operable selector valve device 2 may, for sake of illustration, be of the cock type comprising a plug valve 12 manually rotatable by a handle (not shown). With valve 12 in a normal position, in which it is shown in Fig. 1, a port 13 therein connects a passage 14 to an atmospheric vent port 15; a cavity 16 in said valve is exposed solely to a passage 17 leading to a volume 18, preferably provided in the pipe bracket 1; a passage 19 leading to brake cylinder exhaust pipe 11 is lapped by said valve 12; and a passage 20 leading to a secondary volume 21, larger than volume 18, is also lapped by said valve 12.

The pneumatically controlled selector valve device 3 comprises a movable abutment, preferably in the form of an annular flexible diaphragm 22 suitably clamped about its outer edge between sections of the casing and about its inner edge between portions of a diaphragm follower assemblage 23. This movable abutment is subject at one side to pressure of fluid in a chamber 24 constantly open to passage 14 and subject at the opposite side to pressure of a light helical bias spring 25 in an atmospheric chamber 26. Coaxially connected to the follower assemblage 23 by a valve stem is a spool valve 27 having sealing, slidably guided contact with the wall of an aligned bore 28 open at one end to atmospheric chamber 26 and open at the opposite end to atmosphere via a choke 29.

The loading device 3a comprises a second movable abutment, arranged coaxially with the follower assemblage 23, and preferably comprising an annular flexible diaphragm 30 suitably clamped about its outer edge between sections of the casing and about its inner edge between portions of a diaphragm follower assemblage 31. This movable abutment is subject at one side to pressure of fluid in a chamber 32 and at the opposite side to atmospheric pressure in a chamber 33 that is separated from chamber 24 by a casing partition 34. A pusher stem 35, arranged coaxially with the follower assemblages 23 and 31, has sealing, slidably guided contact with the wall of an aligned bore through casing partition 34; said pusher stem serving to transmit the force developed on the second movable abutment by fluid pressure in chamber 32 to the valve 27, which is connected to the first movable abutment.

In operation, with plug valve 12 in its normal position, in which it is shown, chamber 24 of valve device 3 will be vented via passage 14, port 13 in valve 12, and vent port 15, with the result that the spool valve 27 will be biased to a normal position, in which it is shown, by pressure of spring 25 on follower assemblage 23. With valve 27 in this position, an elongated annular cavity 36 therein connects a passage 37 leading to chamber 32 with a passage 38 open to atmosphere via a choke 39; another elongated annular cavity 40, formed in said spool valve intermediate cavity 36 and the end of valve 27, is exposed solely to a passage 41 leading through pipe bracket 1 and open to control reservoir 6; a branch of passage 17 is uncovered past the end of said spool valve to the atmospheric choke 29 for venting the volume 18; and a passage 42 connected at the pipe bracket 1 to a branch of brake cylinder pipe 10 is lapped by said valve 27.

Thus, with plug valve 12 in its normal position, all fluid pressure communications from the brake controlling valve device 4 to the selector means will be effectively lapped, and hence said valve device 4 will be conditioned to operate to control application and release of brakes in the normal manner briefly described above and more fully described in the aforementioned copending application of Cook et al. More specifically, the valve device 4 will operate to provide any desired degree of graduated release of brakes corresponding to the extent to which brake pipe pressure is restored following a brake application. The plug valve 12 on a particular car is therefore placed in normal position when the other cars of the train are equipped with a self-lapping type brake controlling valve device, such as the No. 26, denoted by the reference numeral 4.

The brake cylinder exhaust pipe 11 and passage 19 are shown connected to atmosphere via a choke 43 for permitting a full release of brake cylinder pressure and hence of brakes. If desired, the choke 43 may be removed and a brake cylinder retaining pipe (not shown) may be connected to the pipe bracket 1, in place of choke 43, so that a brake cylinder pressure of 10 p. s. i. or 20 p. s. i. may be retained in the brake cylinder 8 by operation in the usual manner of a suitable brake cylinder retaining valve device (not shown).

*Description—Fig. 2*

Assume now that it is desired to haul a car equipped with the self-lapping type brake controlling valve device 4 in a train having other cars equipped with an- other type of brake controlling valve device which does not follow the brake cylinder pressure release pattern of the device 4 and is not capable (like the valve device 4) of effecting graduated release in an almost infinite number of steps or stages. This other type of brake controlling valve device may be of the D-22 type, shown and described in Instruction Pamphlet No. 5050-8, published July 1954, by Westinghouse Air Brake Company. This D-22 type valve embodies means for effecting a substantial, such as 9 p. s. i., reduction in brake cylinder pressure more than the valve device 4 in the initial step of a graduated release in addition to the reduction corresponding to the extent of brake pipe pressure increase, and can effect further graduated release in a total of only 2 to 5 additional steps or stages following said initial step.

So that the brake controlling valve device 4 will operate to control graduated release of brakes in a manner compatible with the D-22 control valve, the plug valve 12 is rotated to the position in which it is shown in Fig. 2 of the drawing. With plug valve 12 in this position, atmospheric port 15 and passage 20 will be lapped by said valve; port 16 will be exposed solely to passage 17 and port 13 in said valve will connect passage 14 with passage 19, thereby assuring that the chamber 24 will be maintained vented via choke 43 and the valve 27 thus maintained in normal position, as shown, unless and until fluid under pressure is released into the brake cylinder exhaust pipe 11 during a brake releasing operation.

With valve 12 in this position, when the brake controlling valve device 4 responds to an increase in pressure in the brake pipe 7 to connect brake cylinder pipe 10 to exhaust pipe 11 for releasing an application of brakes, fluid under pressure will flow from the brake cylinder 8 via the pipes 10 and 11 to atmosphere at the restricted rate controlled by choke 43 and also at a substantially unrestricted rate via passage 19, port 13 in plug valve 12, and passage 14 to chamber 24 of valve device 3 for causing the diaphragm 22 to deflect against resistance of spring 25 and thereby shift the spool valve 27 to an application position, defined by contact of the follower assemblage 23 with a stop surface 44 provided in chamber 26.

During movement of spool valve 27 to this position, passage 17 will be cut off from the atmospheric vent choke 29 for thereby cutting off the volume 18 from atmosphere and passage 37 will be cut off from atmospheric vent choke 39 for cutting off chamber 32 from atmosphere; and then fluid under pressure will be supplied from the control reservoir 6 via passage 41, valve cavity 40 and passage 17 to said volume 18, which volume is of sufficient capactity to effect a chosen, such as 3 p. s. i., reduction in control reservoir pressure. The brake controlling valve device 4 will respond to this chosen reduction in control reservoir pressure to effect a proportionate, such as 9 p. s. i., reduction in brake cylinder pressure in addition to the degree of brake cylinder pressure reduction corresponding to the degree of brake pipe pressure increase, with the result that pressure in the brake cylinder 8 will have been reduced an extent corresponding approximately to the initial step of brake release which will have been effected by the D-22 control valve, in the manner more fully explained in the aforementioned Instruction Pamphlet. In other words, with this extra 9 p. s. i. reduction in brake cylinder pressure effected on top of the reduction corresponding to the degree of brake pipe pressure increase, the brake cylinder pressure release pattern for a given brake pipe pressure increase will conform substantially to that effected by the D-22 control valve.

Meanwhile, with spool valve 27 in application position, fluid under pressure will flow from the brake cylinder 8 via pipe 10, passage 42, valve cavity 36, and passage 37 to chamber 32, for causing diaphragm 30 to deflect downward and, through the medium of pusher stem 35, impose a fluid pressure loading force on the follower assemblage 23, whereby the spool valve 27 will be maintained in application position, so long as the brake cylinder 8 is charged with fluid under pressure and irrespective of the blowdown of pressure in chamber 24 via valve 12 and choke 43.

With the spool valve 27 thus locked down in application position, it will be apparent that successive further steps or stages of graduated brake release will be effected in direct proportion to the steps or stages of further brake pipe increase, and in this manner closely approximate the brake cylinder pressure reductions obtained on the other cars equipped with the D-22 type control valves. As determined by actual test, the brake controlling valve device 4 will operate responsively to these further stages of brake pipe pressure increase to release brake cylinder pressure in from 2 to 5 additional steps or stages corresponding very closely to the steps or stages of graduated release of brake cylinder pressure effected by the D-22 control valve.

When the brake cylinder 8 and hence the chambers 32 and 24 are substantially vented, the spring 25 will be effective to return the valve 27 to its normal position, as shown.

It is to be noted that, if desired, a reduction in control reservoir pressure in not only the initial step of a graduated brake release but also during each subsequent step may be effected by eliminating the loading device 3a and the interlock connection (including 37, 36, 38, 39 and 42), in which case the capacity of volume 18 should be reduced. The chamber 24 of device 3 would then be vented by blowdown through choke 43, causing spring 25 to shift the valve device 3 to its normal position, in which it is shown, to vent the volume 18 in readiness for the next actuation of the device 3 to application position, responsively to admission of brake cylinder pressure to the exhaust pipe 11 by valve device 4 during a subsequent graduated release operation.

It should also be noted that if preferred, the capacity of volume 18 could be increased substantially so as to effect a sufficient reduction in control reservoir pressure, with the plug valve 12 in the position shown in Fig. 2, to cause the device 4 to operate to effect a full direct release of brake cylinder pressure.

*Description—Fig. 3*

Assuming now that it is desired to haul a car equipped with the self-lapping type brake controlling valve device 4 in a train having other cars equipped with direct release type brake controlling valve devices, such as the AB, AC or K control valves, the plug valve 12 is rotated to a direct release position, in which it is shown in Fig. 3. With valve 12 in this position, passage 14 is connected to passage 19 by valve port 13, and passage 17 is connected to passage 20 by valve port 16.

Assume further that brake pipe pressure is equal to control reservoir pressure and that the brake cylinder 8 is therefore completely devoid of fluid under pressure. Under this condition, chamber 24 of device 3 will be vented via passage 14, plug valve 12, passage 19 and exhaust choke 43; and chamber 32 will be vented via passage 37, spool valve cavity 36, and atmospheric exhaust choke 39, with the result that spool valve 27 will be in its normal position, in which it is shown in Fig. 1 of the drawing.

If brake pipe pressure is now reduced relative to control reservoir pressure for causing an application of brakes, the brake controlling valve device 4 will operate to provide fluid at a corresponding pressure in the brake cylinder 8; and positioning of selector valve device 3 or device 3a will not be affected because the pipe 11 and hence chamber 24 will not be charged with fluid under pressure during a brake application.

The valve device 4 will respond to a subsequent increase in brake pipe pressure to connect pipe 10 to pipe 11 for thereby releasing fluid from the brake cylinder 8 into the exhaust pipe 11. Some of the fluid thus supplied to pipe 11 will flow to atmosphere at a relatively restricted rate via choke 43 and also at a relatively unrestricted rate through passage 19, valve port 13 and passage 14 to chamber 24 of device 3 for deflecting diaphragm 22 downwardly and thereby shifting the valve 27 to its application position. With valve 27 in this position and valve 12 in the position in which it is shown in Fig. 3, fluid pressure in the control reservoir 6 will equalize into the volumes 18 and 21 via passage 41, valve cavity 40, passage 17, plug valve port 16 and passage 20. This equalization will cause a reduction in control reservoir pressure of a selected degree, such as 10 to 15 p. s. i., sufficient to cause the valve device 4 to move to and remain in its release position and thereby effect a full direct release of brake cylinder pressure. Meanwhile, with valve 27 in application position, the brake cylinder 8 will be connected via passage 42, valve cavity 36 and passage 37 to chamber 32 such that brake cylinder pressure will be effective in chamber 32 for causing the loading device 3a to hold the valve 27 in application position until the brake cylinder 8 and hence the chambers 32 and 24 are substantially vented; whereupon the spring 25 will be effective to return the valve 27 to its normal position, as shown.

It is to be noted that the cavity 36 of valve 27 is of such length that during movement of the valve 27 from application position back to normal position near the end of a brake release, the cavity 36 successively uncovers passage 38 to the passages 37 and 42 and then moves out of registry with passage 42. Unless this "overlap" in connections is provided, fluid pressure might be trapped in chamber 32 and exert a loading force on the diaphragm 30 sufficient to prevent return of valve 27 to normal position. In view of this "overlap," the choke 39 is provided to prevent unrestricted blowdown of brake cylinder pressure to atmosphere during movement of valve 27 from normal position to application position.

*Summary*

It will now be seen that the brake release selector means embodying the invention comprises an operator controlled selector valve device 2 and a pneumatically controlled selector valve device 3 including a fluid pressure loading device 3a.

When the device 2 is in one position (Fig. 1), the devices 3 and 3a will be rendered ineffective and the self-lapping brake controlling valve device 4 will thus operate to control brakes in the usual manner and in harmony with the type of brake release control effected by similar self-lapping devices 4 provided on the other cars of a train. In other words, the degree of brake cylinder pressure reduction will vary in direct proportion to the degree to which brake pipe pressure is increased following a brake application.

When the device 2 is an another position (Fig. 2), the device 3 will operate responsively to an initial increase in brake pipe pressure following a brake application to effect a chosen reduction, such as 3 p. s. i., in control reservoir pressure by causing pressure in the control reservoir 6 to equalize into a volume 18 and thereby causing the valve device 4 to operate to effect a corresponding 9 p. s. i. reduction in brake cylinder pressure on top of that brake cylinder pressure reduction corresponding to the extent of operator-effected increase in brake pipe pressure. After this initial increase in brake pipe pressure and the consequent 9 p. s. i. extra reduction in brake cylinder pressure caused thereby, further reductions in brake cylinder pressure will be controlled substantially in proportion to the degree of subsequent increase in brake pipe pressure; in other words, no additional 9 p. s. i. "bites" will be taken out of the brake cylinder during successive graduated release steps or stages following the first step. The brake cylinder pressure release pattern or curve thus obtained by so modifying operation of the valve device 4 corresponds very closely to the brake cylinder pressure release pattern obtained with the D-22 control valve over a wide range of values of brake pipe pressure; and the valve device 4 will thus operate to control brakes on a particular car in harmony with the type of release control effected on other cars equipped with D-22 control valves.

When the device 2 is in a direct release position (Fig. 3), the device 3 will operate, responsively to an initial increase in brake pipe pressure following a brake application, to effect a selected reduction, such as 10 to 15 p. s. i., in control reservoir pressure by causing the control reservoir pressure to equalize into two volumes 18 and 21. With control reservoir pressure thus reduced, the valve device 4 will be positively biased to release position and thus operate to effect a full direct release of brake cylinder pressure.

Having now described the invention, what we claim as new and desire to secure by Letters Patent, is:

1. A fluid pressure brake apparatus comprising, in combination, a brake pipe, a control reservoir, a brake cylinder, a brake cylinder exhaust communication, brake controlling valve means controlled by control reservoir pressure opposing brake pipe pressure and brake cylinder pressure and operative following a brake application to connect said brake cylinder to said exhaust communication for reducing brake cylinder pressure a degree corresponding to the extent of reduction in differential between control reservoir pressure and brake pipe pressure, volume means, means defining a chamber, other valve means normally biased to a position for venting said volume means and responsive to pressurization of said chamber to terminate venting of said volume means and connect said control reservoir to said volume means for effecting a chosen reduction in control reservoir pressure, and operator-controlled valve means normally positioned to vent said chamber and operative to a second position to connect said exhaust communication to said chamber, whereby operation of said brake controlling valve means will be modified to provide different brake cylinder pressure release control according to positioning of said operator-controlled valve means.

2. A fluid pressure brake apparatus comprising, in combination, a brake pipe, a control reservoir, a brake cylinder, a brake cylinder exhaust communication, brake controlling valve means controlled by control reservoir pressure opposing brake pipe pressure and brake cylinder pressure and operative following a brake application to connect said brake cylinder to said exhaust communication for reducing brake cylinder pressure a degree corresponding to the extent of reduction in differential between control reservoir pressure and brake pipe pressure, volume means, means defining a first chamber and a second chamber, other valve means normally biased to a position for venting said volume means and second chamber and operative to another position responsively to pressurization of said first chamber to terminate venting of said volume means and second chamber and connect said control reservoir to said volume means for effecting a chosen reduction in control reservoir pressure while also connecting said second chamber with said brake cylinder, loading means responsive to pressurization of said second chamber to impose a variable fluid pressure bias on said other valve means for holding the latter in its said other position until the brake cylinder is substantially devoid of fluid under pressure, and operator-controlled valve means normally positioned to vent said first chamber and operative to another position to connect said exhaust communication to said first chamber, whereby said brake controlling valve means will be caused to operate to provide different brake cylinder pressure release patterns according to positioning of said operator-controlled valve means.

3. A fluid pressure brake apparatus comprising, in combination, a normally charged brake pipe, a control reservoir normally containing fluid at the normal charge value of brake pipe pressure, a brake cylinder, a brake cylinder exhaust pipe, choke means via which said exhaust pipe is connected to atmosphere, brake controlling valve means responsive to a reduction in brake pipe pressure below control reservoir pressure to provide fluid at a corresponding pressure in said brake cylinder and responsive to a subsequent increase in brake pipe pressure to effect a corresponding release of brake cylinder pressure via said exhaust pipe, a first volume, a second volume, other valve means normally venting said first volume and responsive to pressurization of a chamber to cut off the venting of said first volume and connect said control reservoir to said first volume for effecting a chosen reduction in control reservoir pressure, and operator-controlled valve means normally in a first position to prevent pressurization of said chamber, and operative to a second position to connect said exhaust pipe to said chamber in bypass of said choke means while preventing flow between said first and second volumes, and operative to a third position to establish such bypass connection and also connect said first volume to said second volume for causing a chosen greater reduction in control reservoir pressure upon connection of said first volume with said control reservoir, whereby said brake controlling valve means will operate to provide different brake cylinder pressure release patterns according to positioning of said operator-controlled valve means.

4. A fluid pressure brake apparatus comprising, in combination, a normally charged brake pipe, a control reservoir normally containing fluid at the normal charge value of brake pipe pressure, a brake cylinder, a brake cylinder exhaust pipe, choken means via which said exhaust pipe is connected to atmosphere, a brake controlling valve device controlled by control reservoir pressure opposing brake pipe pressure and brake cylinder pressure and responsive to a reduction in brake pipe pressure relative to control reservoir pressure to supply fluid under pressure to said brake cylinder and responsive to a subsequent increase in brake pipe pressure to release fluid under pressure from said brake cylinder via said exhaust pipe to a degree corresponding to the extent of reduction in differential between control reservoir pressure and brake pipe pressure, a first volume, a second volume, means defining a first chamber and a second chamber, valve means biased to a normal position for venting said first volume and second chamber and operative to another position responsively to pressurization of said first chamber for cutting off venting of said first volume and second chamber and then connecting said control reservoir to said first volume and connecting said brake cylinder to said second chamber, fluid pressure loading means responsive to pressurization of said second chamber to impose a bias on said valve means for holding the latter in its said other position until the brake cylinder is substantially vented, and operator-controlled valve means operative to a first position for venting said first chamber while cutting off said first volume from said second volume, to a second position for cutting off venting of said first chamber and connecting said first chamber to said exhaust pipe in bypass of said choke means, and to a third position for connecting said first chamber to said exhaust pipe in bypass of said choke means while also connecting said first volume with said second volume, whereby operation of said device will be modified to provide different brake cylinder pressure release patterns according to positioning of said operator-controlled valve means.

5. A fluid pressure brake apparatus comprising, in combination, a normally charged brake pipe, a control reservoir normally containing fluid at the normal charge value of brake pipe pressure, a brake cylinder, a brake cylinder exhaust pipe, choke means via which said exhaust pipe is connected to atmosphere, a brake controlling valve device controlled by control reservoir pressure opposing brake pipe pressure and brake cylinder pressure and responsive to a reduction in brake pipe pressure relative to control reservoir pressure to supply fluid under pressure to said brake cylinder and responsive to a subsequent increase in brake pipe pressure to release fluid under pressure from said brake cylinder via said exhaust pipe to a degree corresponding to the extent of reduction in differential between control reservoir pressure and brake pipe pressure, volume means, means defining a first chamber and a second chamber, a selector valve device comprising a plurality of movable abutments so arranged as to be operable as a stack and valve means controlled by said stack, said stack being subject to pressures of fluid in said first and second chambers opposing a spring bias, said stack being biased to a normal position for causing said valve means to vent said volume means and second chamber and responsive to pressurization of said first chamber to move to another position for causing said valve means to terminate such venting of said volume means and second chamber and connect said brake cylinder to said second chamber while also connecting said control reservoir to said volume means for effecting a reduction in control reservoir pressure, and operator-controlled valve means normally positioned to prevent pressurization of said first chamber and operative to connect said exhaust pipe to said first chamber, whereby upon pressurization of said first chamber said brake controlling valve device will operate in consequence of said reduction in brake cylinder pressure to effect a full direct release of brake cylinder pressure.

6. The combination according to claim 5 including second choke means via which said volume means is open to atmosphere in said normal position of said stack, and third choke means via which said second chamber is open to atmosphere in said normal position of said stack.

References Cited in the file of this patent
UNITED STATES PATENTS
1,956,674    Farmer _____ May 1, 1934